US011292091B1

(12) United States Patent
Brown et al.

(10) Patent No.: US 11,292,091 B1
(45) Date of Patent: Apr. 5, 2022

(54) DOWEL BASKET ASSEMBLY MACHINE

(71) Applicants: Thomas Mills Brown, Coweta, OK (US); Myron Grubowski, Claremore, OK (US); Robert Dean Smith, Coweta, OK (US); Micah Duane Smith, Coweta, OK (US)

(72) Inventors: Thomas Mills Brown, Coweta, OK (US); Myron Grubowski, Claremore, OK (US); Robert Dean Smith, Coweta, OK (US); Micah Duane Smith, Coweta, OK (US)

( * ) Notice: Subject to any disclaimer, the term of this patent is extended or adjusted under 35 U.S.C. 154(b) by 496 days.

(21) Appl. No.: 16/229,885

(22) Filed: Dec. 21, 2018

(51) Int. Cl.
*B23K 37/04* (2006.01)
*B23K 9/02* (2006.01)
(Continued)

(52) U.S. Cl.
CPC ............ *B23K 37/0452* (2013.01); *B23K 9/02* (2013.01); *B65G 7/00* (2013.01); *B65G 9/00* (2013.01);
(Continued)

(58) Field of Classification Search
CPC ...... B23K 37/0452; B23K 9/02; B23K 37/04; B23K 37/0538; B23K 11/11; B23K 37/0461; B65G 7/00; B65G 9/00; B65G 29/00; B65G 47/848; B65G 69/00; B65G 69/0458; B65G 15/62; B41F 15/10; B41F 15/34; B28B 7/0038; E01C 11/14; E01C 11/18; F16B 7/0493
USPC .................. 219/148, 121.63, 125.1, 121.58; 228/47.1, 212, 213, 44.3, 44.7, 48–49.4, 228/49.6; 414/301; 101/115, 127.1, 129, 101/127, 128, 114; 404/70; 52/561; 53/95
See application file for complete search history.

(56) References Cited

U.S. PATENT DOCUMENTS 1,978,522 A * 10/1934 Darling ..................... B67B 3/02
53/95
4,595,186 A * 6/1986 Reed .................. B23K 37/0461
269/243
(Continued)

FOREIGN PATENT DOCUMENTS

EP         0536600 A1    9/1992
EP         1655088 A1    5/2006
(Continued)

*Primary Examiner* — Joel M Attey
*Assistant Examiner* — Yeong Juen Thong
(74) *Attorney, Agent, or Firm* — James F. Lea, III; Gable Gotwals

(57) ABSTRACT

A dowel basket assembly apparatus includes a jig table rotationally supported on a bearing assembly, which supports a table top assembly having arms extending radially outwardly and supporting first, second and third jig table bases. The bases move through first, second and third stations by rotating the assembly. First jig table is positioned at first station, second jig table at second station, and third jig table at third station. Rods are located in receptacles on first jig table base at first station. Simultaneously, rods are welded to form a dowel basket on second jig table base at second station. Simultaneously, a welded dowel basket is unloaded from third jig table base at third station. After completion of the steps of locating, welding and retrieving, the apparatus is rotated to advance the jig tables to the next station.

12 Claims, 11 Drawing Sheets

(51) Int. Cl.
  *B65G 9/00*   (2006.01)
  *B65G 69/00*  (2006.01)
  *B65G 69/04*  (2006.01)
  *B65G 7/00*   (2006.01)
  *B65G 47/84*  (2006.01)
  *B65G 29/00*  (2006.01)

(52) U.S. Cl.
  CPC ........... *B65G 29/00* (2013.01); *B65G 47/848* (2013.01); *B65G 69/00* (2013.01); *B65G 69/0458* (2013.01)

(56) References Cited

U.S. PATENT DOCUMENTS

| | | | |
|---|---|---|---|
| 4,907,506 A * | 3/1990 | Davis | B41F 15/0863 |
| | | | 101/115 |
| 5,709,117 A | 1/1998 | George | |
| 5,950,474 A | 9/1999 | George et al. | |
| 6,148,873 A | 11/2000 | Mehre | |
| 6,336,896 B1 * | 1/2002 | Hsu | A24C 5/475 |
| | | | 493/39 |
| 6,634,484 B2 * | 10/2003 | Gattrell | B23K 37/0443 |
| | | | 198/375 |
| 6,935,550 B2 | 8/2005 | Caldarone et al. | |
| 9,162,325 B2 | 10/2015 | Furuta et al. | |
| 9,561,557 B2 | 2/2017 | Anagnostopoulos | |
| 2010/0201143 A1 * | 8/2010 | Ehnes | B25J 9/142 |
| | | | 294/198 |
| 2011/0036684 A1 * | 2/2011 | Bonnain | B65G 47/084 |
| | | | 198/418.7 |
| 2014/0270949 A1 * | 9/2014 | Heady | E01C 11/08 |
| | | | 404/70 |
| 2016/0102752 A1 * | 4/2016 | Yelvington | B62K 11/04 |
| | | | 475/269 |
| 2016/0222599 A1 * | 8/2016 | Smith | E01C 11/14 |
| 2019/0135543 A1 * | 5/2019 | Porter | B65G 21/06 |

FOREIGN PATENT DOCUMENTS

| | | |
|---|---|---|
| KR | 20020090559 A | 5/2002 |
| WO | WO2017067857 A1 | 4/2017 |

* cited by examiner

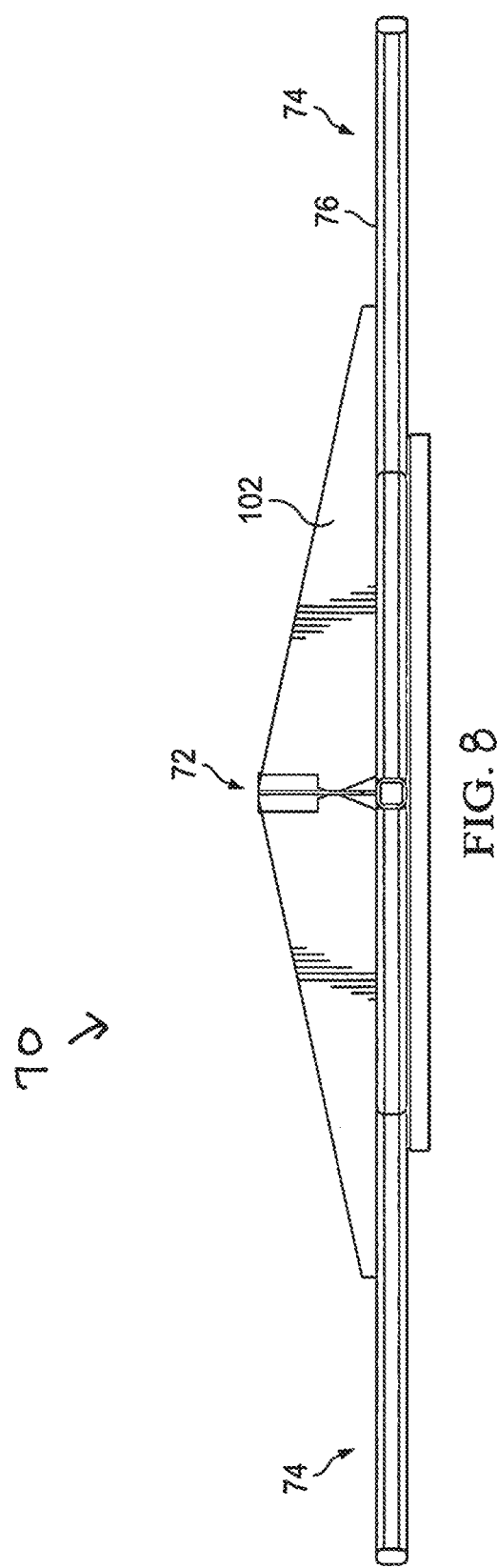

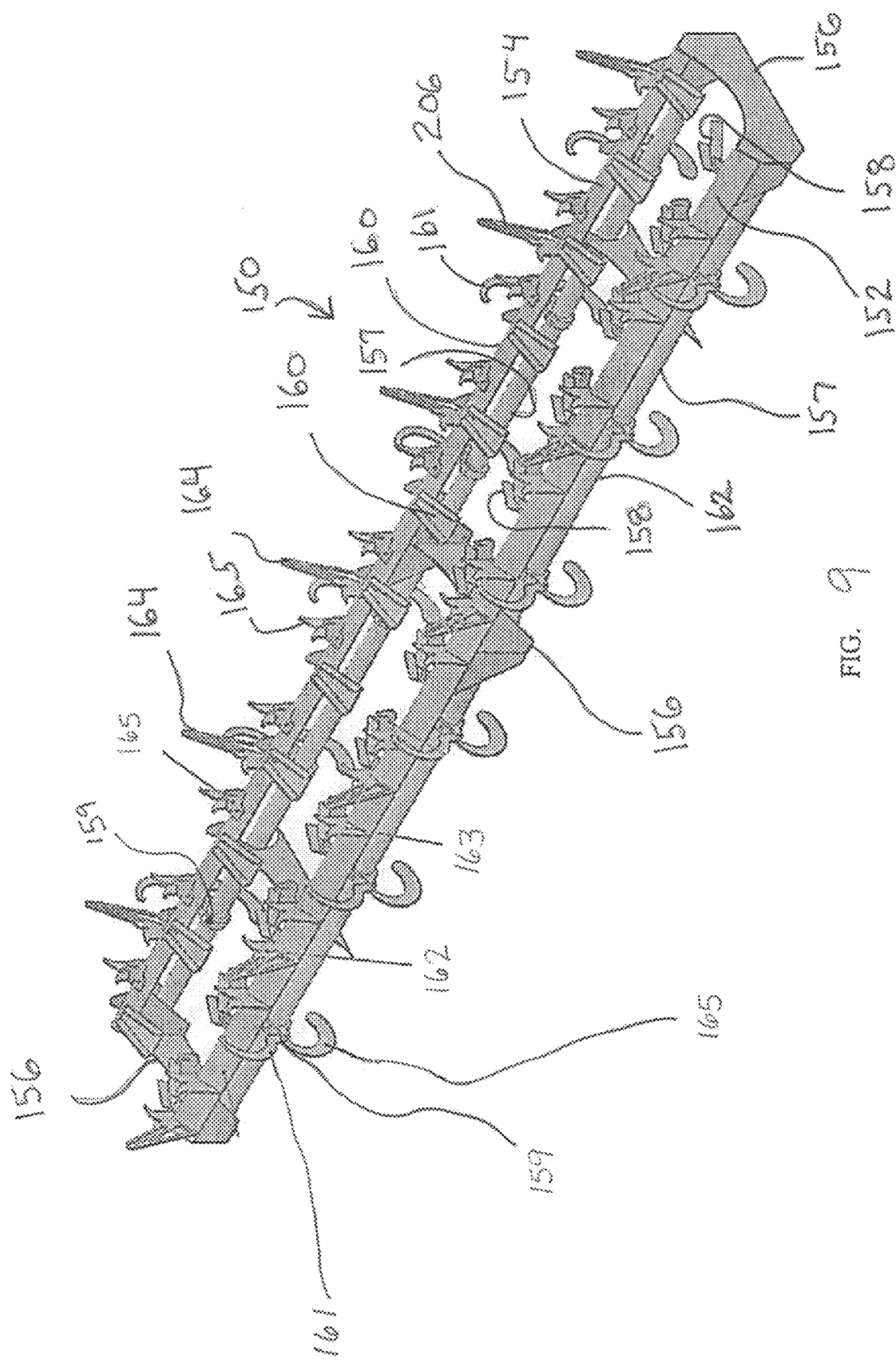

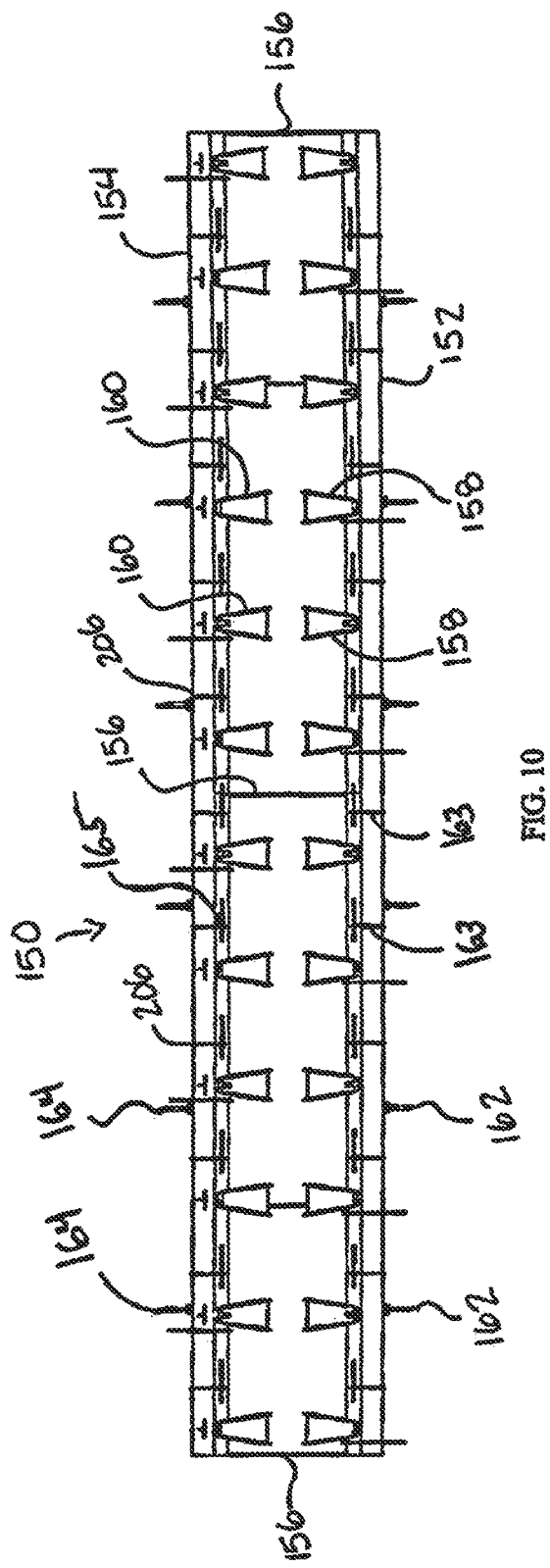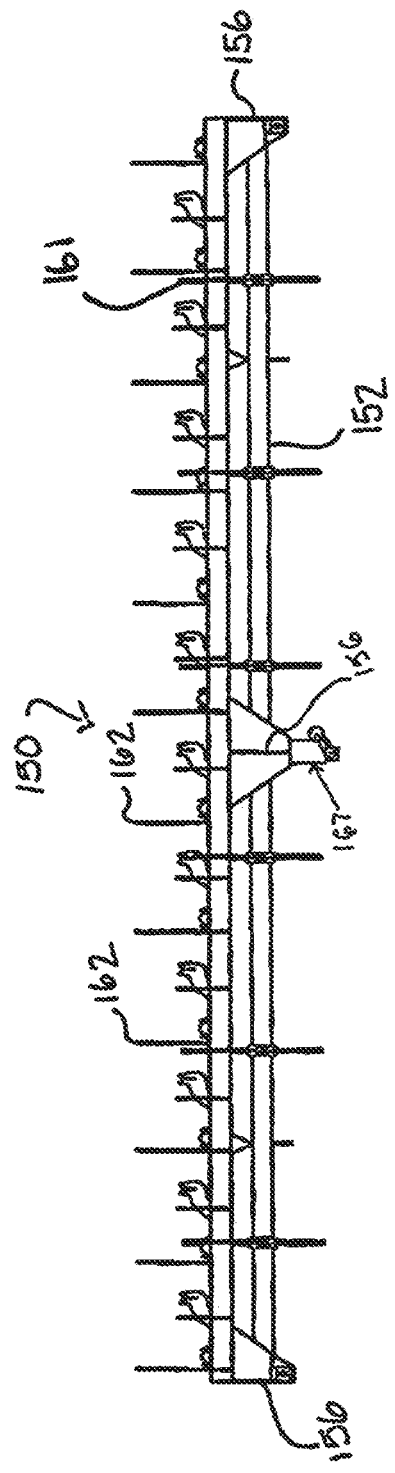

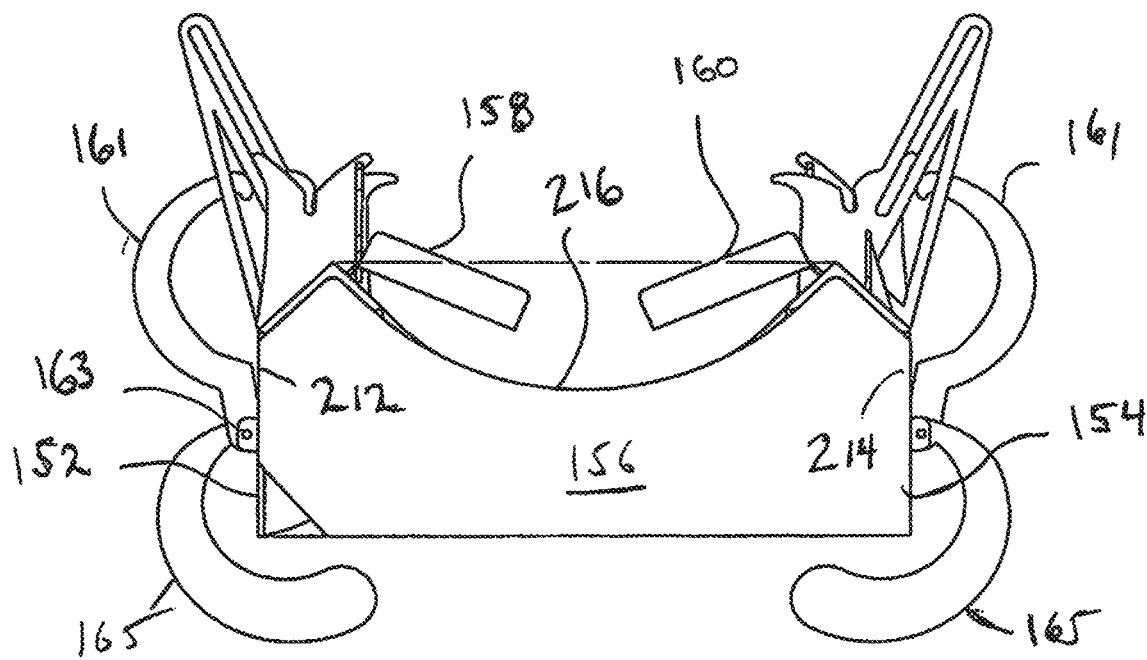
FIG. 12
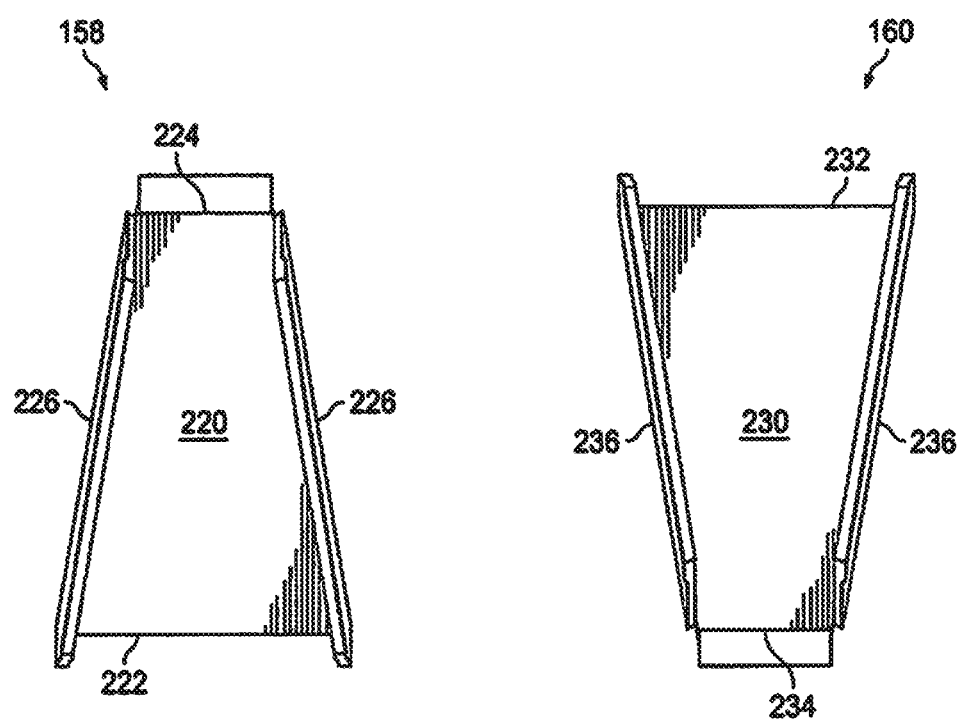
FIG. 13A
FIG. 13B

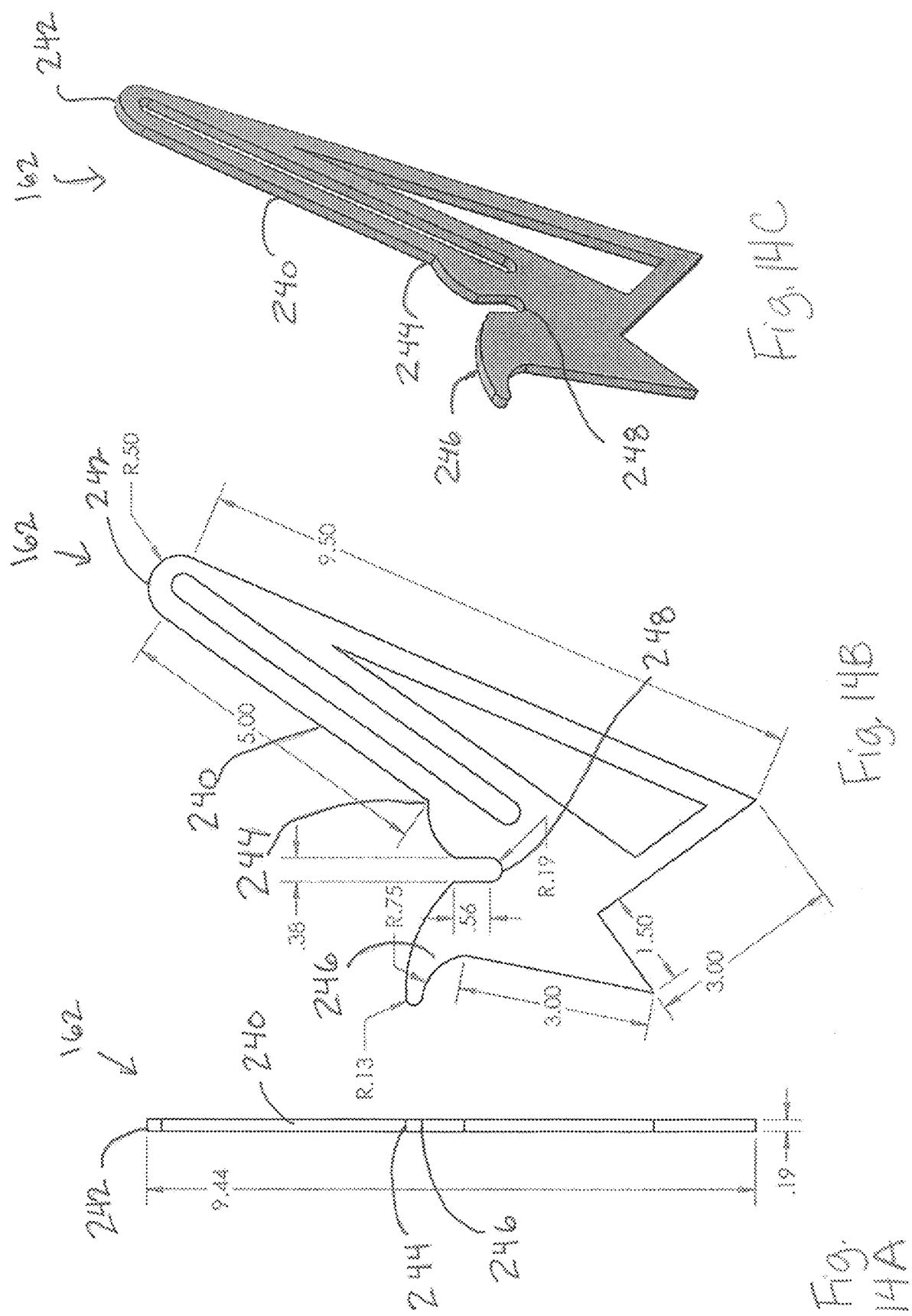

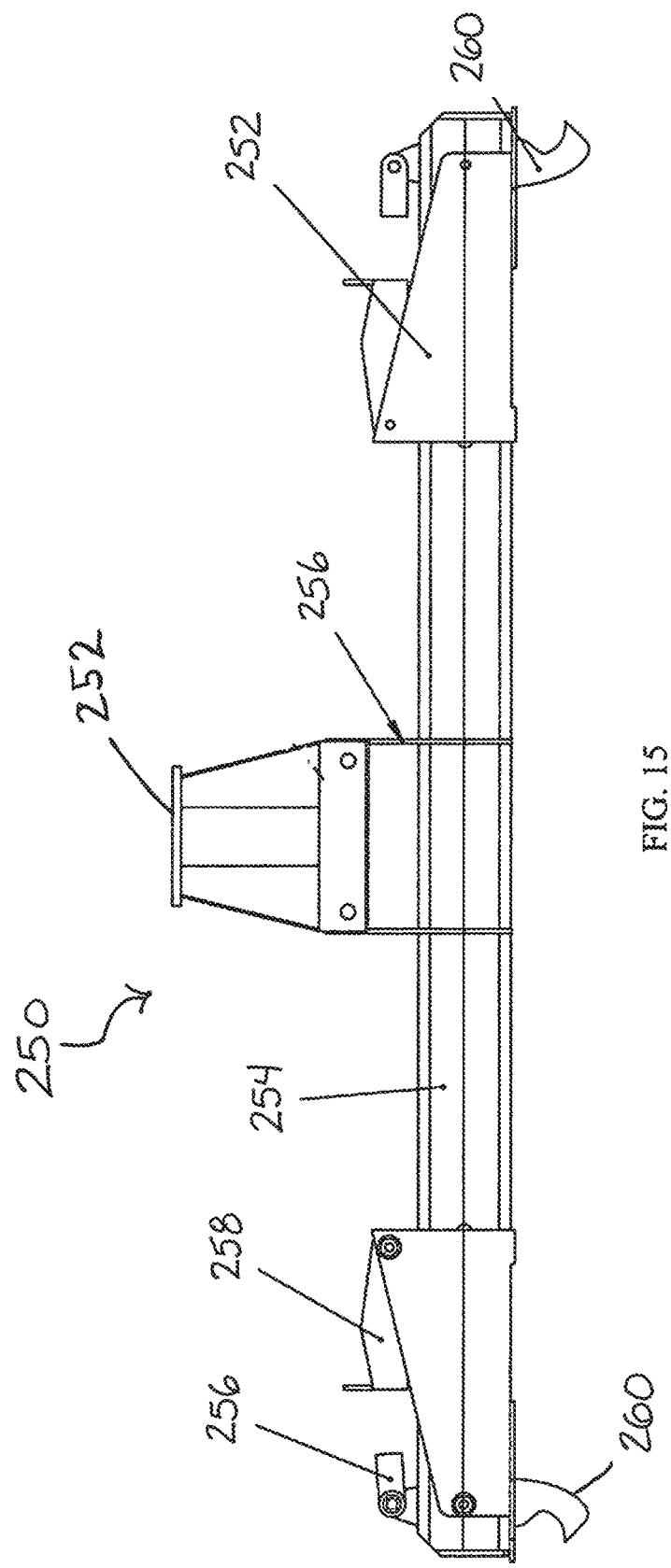

DOWEL BASKET ASSEMBLY MACHINE

FIELD OF THE INVENTION

The invention relates to a rotatable assembly apparatus. More particularly, the invention relates to an assembly apparatus and method of assembly for the manufacture of dowel baskets.

BACKGROUND OF THE INVENTION

Dowel baskets are simple truss structures used to hold dowel bars at an appropriate height before concrete placement. Typically, dowel baskets span an entire lane width and are fabricated from thick gauge wire. They are left in place after concrete placement but do not contribute to the pavement structure. A dowel basket is typically constructed of two sides, each having an upper runner and a lower runner connected by loops. Dowel bars are received in the loops. Dowel baskets are typically fabricated by a welder or welders. Fabrication of a dowel basket is typically labor intensive.

SUMMARY OF THE INVENTION

The invention relates to a rotatable assembly apparatus having three stations for dowel basket fabrication. Frames for a dowel basket are located onto a receiving area on one of three sides of the assembly apparatus or rotatable basket jig. The dowel basket frames include an inside longitudinal rod assembly, including an upper runner, a lower runner, and loops, and an outside longitudinal rod assembly including an upper runner, a lower runner, and loops. Cross members are provided to span between the inside longitudinal rod assembly and outside longitudinal assembly. The loops are located at the bottom with the frames extending upwardly and outwardly. A dowel bar is placed in the loops with the top of the dowel bar facing down, as the dowel basket is assembled in an inverted configuration. Structure is provided on the receiving area of the rotatable basket jig to correctly position the frames.

The basket jig selectively rotates such that a first side is positioned at a loading station where dowel basket components are placed on a basket jig. A second side is positioned at a welding station where a welder welds locations on the bottom or upwardly facing surface of the dowel basket. A third side of the basket jig is positioned at an unloading station where the assembled dowel basket is retrieved and stacked with other assembled dowel baskets in an inverted configuration.

BRIEF DESCRIPTION OF THE DRAWINGS

FIG. 3 is a perspective view of an assembled dowel basket in a deployable orientation.

FIG. 4 is an elevation view of a longitudinal rod assembly of the dowel basket of FIG. 3.

FIG. 8 is an elevation view of a table top assembly of the rotatable apparatus of FIG. 1.

FIG. 9 is a perspective view of a jig table base of the rotatable assembly of FIG. 1.

FIG. 10 is a plan view of a jig table base of the rotatable assembly of FIG. 9.

FIG. 11 is an elevation view of a jig table base of the rotatable assembly of FIG. 9.

FIG. 12 is an end view of a jig table base of the rotatable assembly of FIG. 9.

FIG. 13A is a plan view of an inner dowel receptacle of the jig table base of FIG. 9.

FIG. 13B is a plan view of an outer dowel receptacle of the jig table base of FIG. 9.

FIG. 14A is an end view of an upwardly extending member of the jig table base of FIG. 9.

FIG. 14B is a side view of an upwardly extending member of the jig table base of FIG. 9.

FIG. 14C is a perspective view of an upwardly extending member of the jig table base of FIG. 9.

FIG. 15 is a plan view of a robot pickup assembly for removal of the dowel basket of FIG. 3 from the jig table base at station C of FIG. 1.

DETAILED DESCRIPTION OF THE PREFERRED EMBODIMENTS

Figure 1:
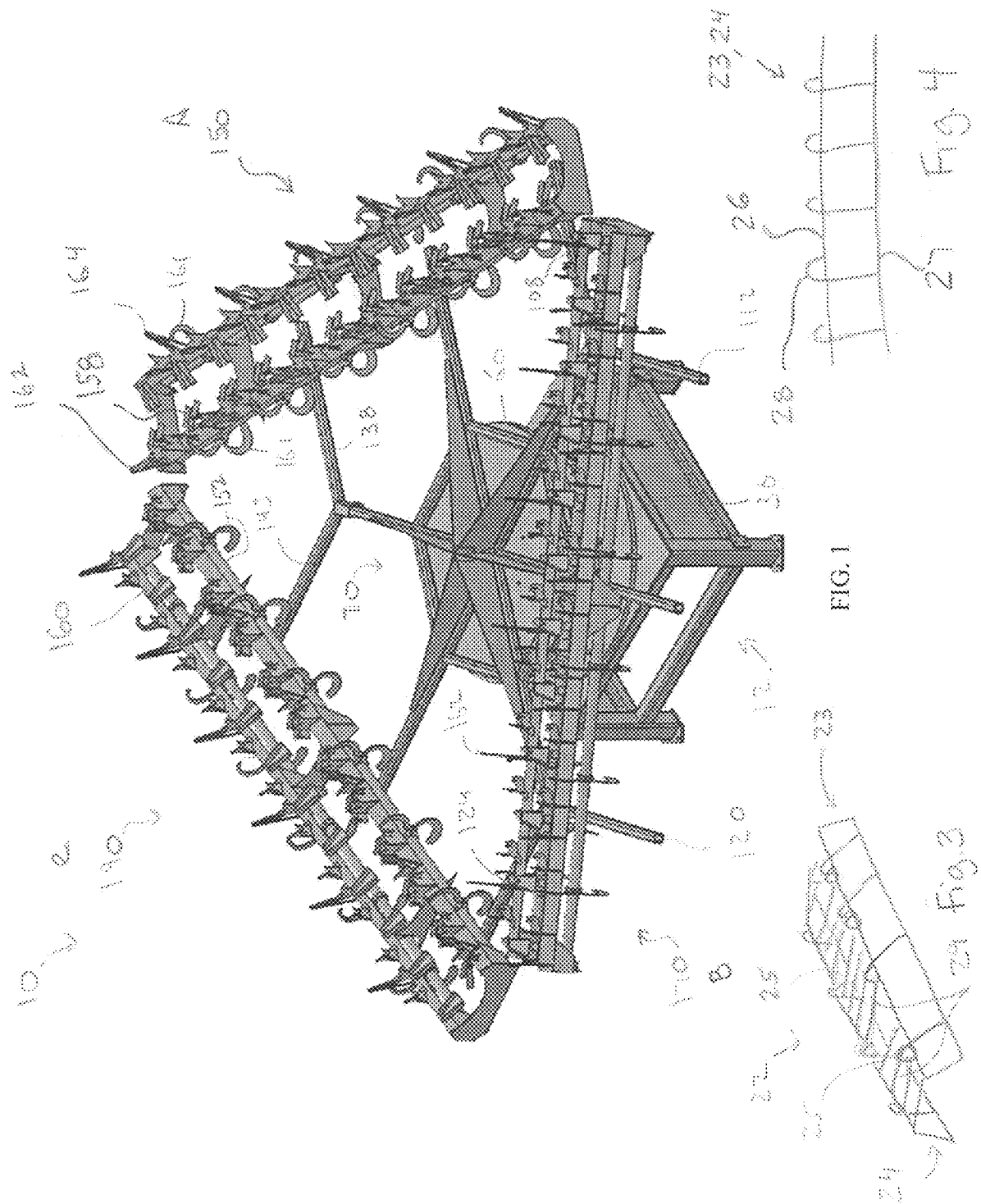
FIG. 1 is a perspective view of a rotatable assembly apparatus of the invention.

Dowel basket assembly apparatus, designated generally 10, includes servo table 12 (FIGS. 1, 2, 5) having a top member 14 supported by legs 16. Side panel 18 spans between two of legs 16. Top member 14 preferably has four sides. Top member 14 defines a central hole 20.

Dowel basket assembly apparatus 10 may be used to economically and efficiently manufacture dowel baskets, e.g., dowel basket 22 (FIG. 3). Dowel basket 22 is constructed of an inside longitudinal rod assembly 23 and an outside longitudinal rod assembly 24 connected together with cross members 25. As best seen in FIG. 4, longitudinal rod assemblies 23, 24 are constructed of upper rod 26, lower rod 27, and loops 28. Dowel bars 29 (FIG. 3) are received in loops 28. Other constructions of dowel basket 22 are also possible.

Figure 5:
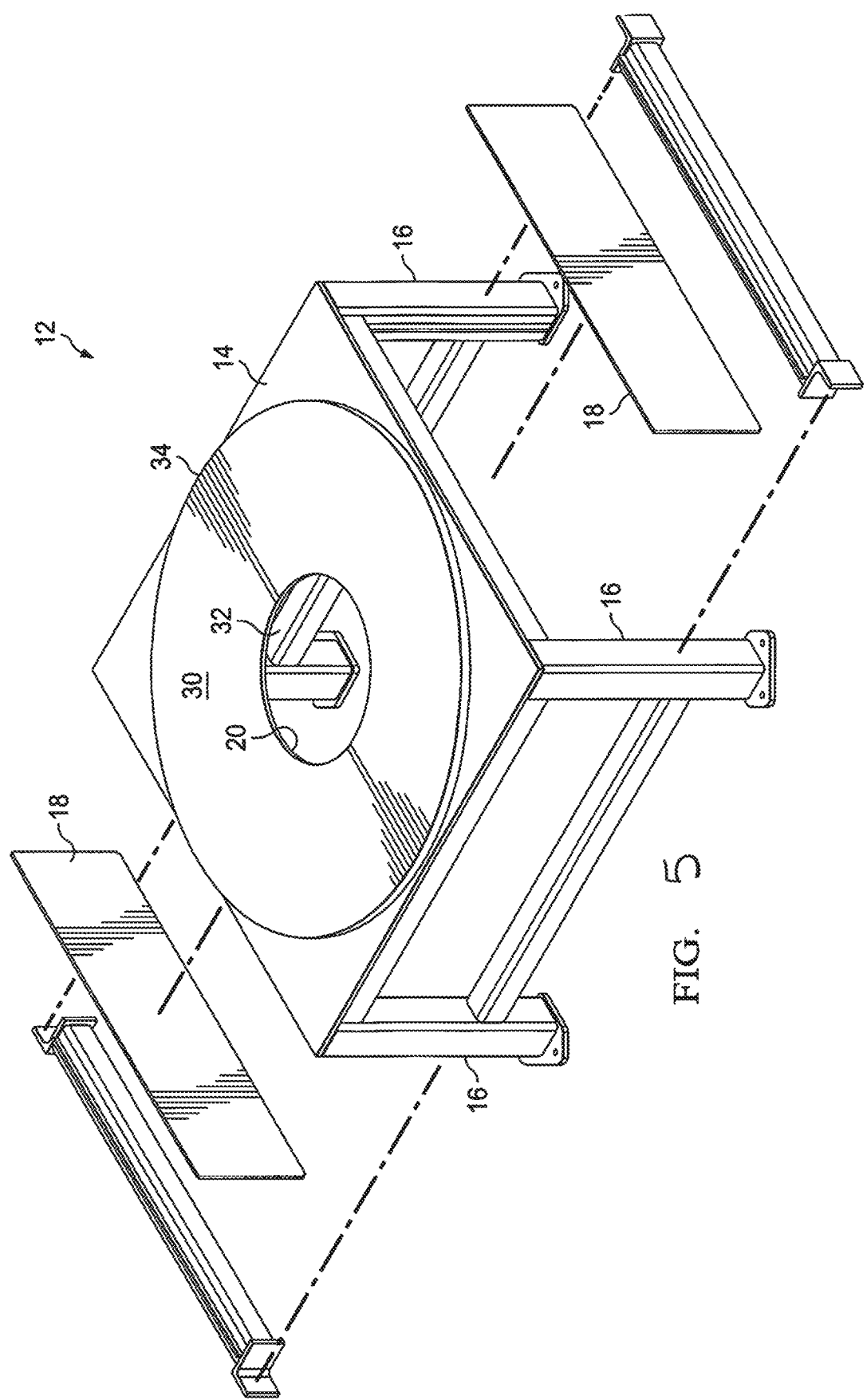
FIG. 5 is a perspective view of a servo table of the rotatable assembly apparatus of FIG. 1.

Bearing tray 30 (FIGS. 1, 2, 5) is supported by top member 14. Bearing tray 30 defines bearing tray orifice 32 (FIG. 5). Bearing tray 30 defines an outer lip 34. Outer lip 34 preferably has a height of approximately one inch.

Figure 6:
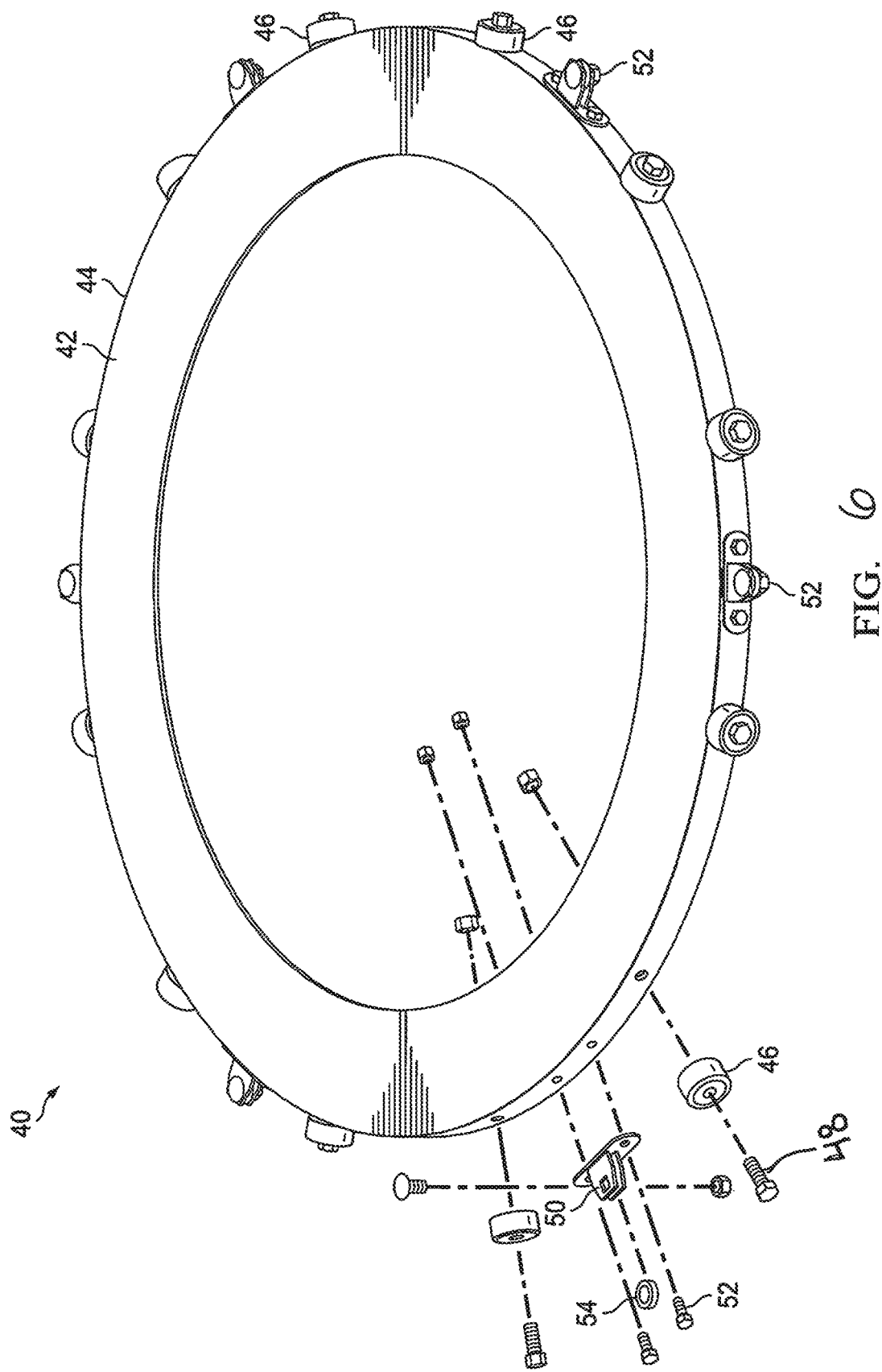
FIG. 6 is a perspective view of a bearing assembly of the rotatable assembly apparatus of FIG. 1.

Bearing assembly 40 (FIGS. 2, 6) is received in bearing tray 30. Bearing assembly 40 has a bearing ring 42 that defines outside diameter 44. Rollers 46 are secured to outside diameter 44 with a fastener 48, such as a bolt. In a preferred embodiment, twelve rollers 46 are equally spaced about outside diameter 44 of bearing ring 42. Rollers 46 support bearing ring 42 on bearing tray 30. Additionally, bearing mounts 50 are secured to outside diameter 44 by fasteners 52, such as a pair of bolts. Bearing mounts 50 support bearing 54. In a preferred embodiment, there are six equally spaced bearing mounts 50 secured to outside diameter 44 of bearing ring 42. Bearings 54 engage outer lip 34 of bearing tray 30.

Jig table 60 (FIGS. 1, 2, 7) is rotationally supported on bearing assembly 40. Central hole 20 of servo table 12 and bearing tray orifice 32 accommodate connection of a mover, such as an electric motor to jig table 60 for facilitating rotation of the jig table 60.

Table top assembly 70 (FIGS. 1, 2, 7, 8) is supported by jig table 60. Table top assembly 70 defines a center 72. Table top assembly 70 is provided with arms 74 that extend radially from center 72. In a preferred embodiment, there are six arms 74. Arms 74 each define a top surface 76.

In a preferred embodiment, table top assembly 70 includes first support arm 78 that extends radially from center 72 to a first terminal end 80. A second branch receiving arm 82 extends radially from center 72 to a second terminal end 84. A third support arm 86 extends radially from center 72 to a third terminal end 88. A fourth branch receiving arm 90 extends radially from center 72 to a fourth terminal end 92. A fifth support arm 94 extends radially from center 72 to a fifth terminal end 96. A sixth branch receiving arm 98 extends radially from center 72 to a sixth terminal end 100.

Figure 7:
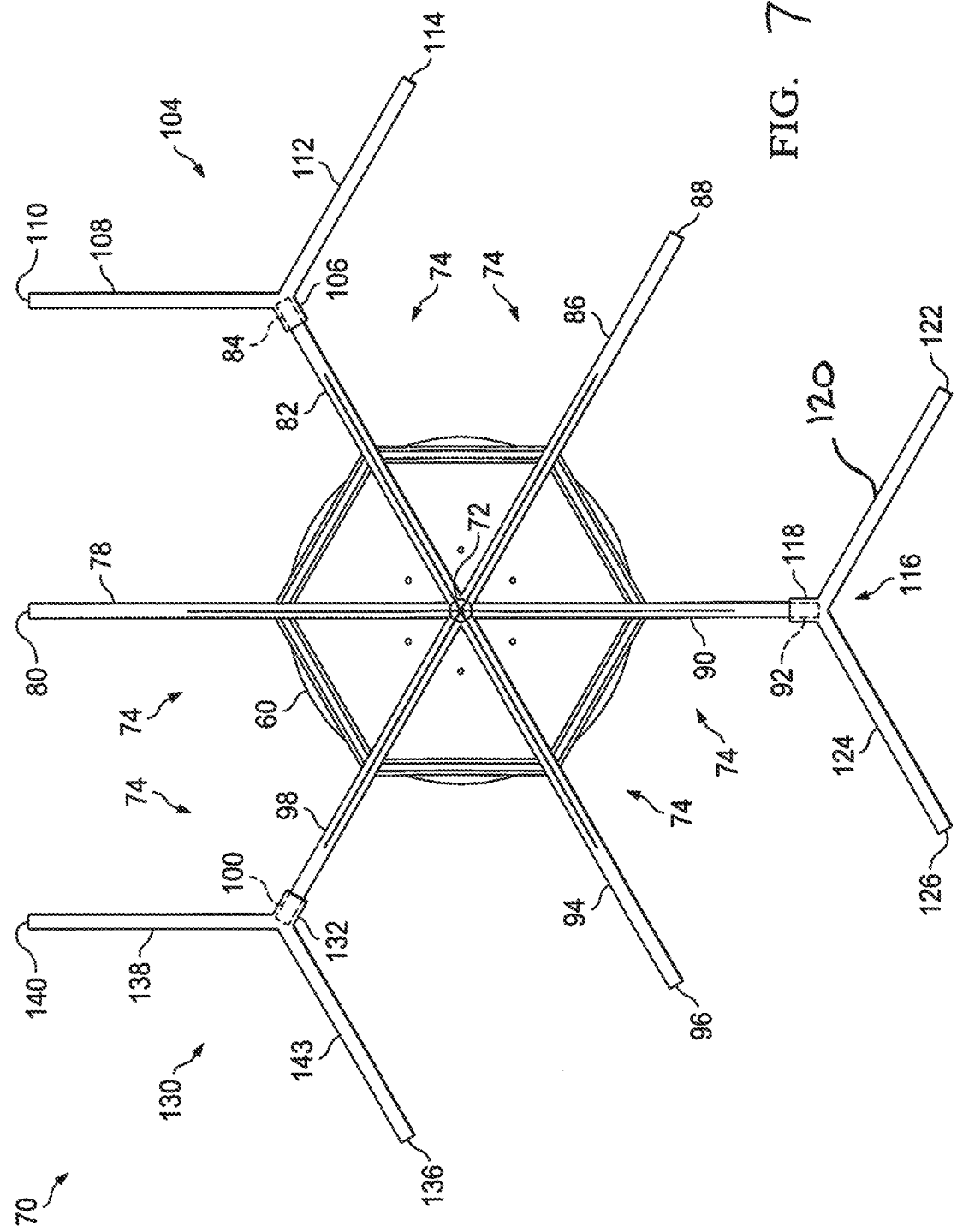
FIG. 7 is a plan view of the table top assembly of the rotatable apparatus of FIG. 1.

Still referring primarily to FIG. 7, support arms 78, 86, and 94 have a length of approximately 58.25 inches from center 72 to terminal ends 80, 88, and 96. In one embodiment, branch receiving arms 82, 90, and 98 have a length of 32.64 inches from center 72 to terminal ends 84, 92, and 100. Support arms 78, 86, and 94 alternate with branch receiving arms 82, 90, and 98. Table top assembly 70 includes vertical supports 102 (FIG. 8) affixed to top surface 76 of arms 74 and extend radially from center 72. In one embodiment, vertical supports 102 have a length of 32.64 inches.

Still referring to FIG. 7, table top assembly 70 further includes a second jig table to basket jig 104 having second receptacle piece 106, a second left extending arm 108 having a second left terminal end 110, a second right extending arm 112 having a second right terminal end 114. Second receptacle piece 106 is received on second terminal end 84 of second branch receiving arm 82.

Table top assembly 70 further includes a fourth jig table to basket jig 116 having a fourth receptacle piece 118, a fourth left extending arm 120 having a fourth left terminal end 122 and a fourth right extending arm 124 having a fourth right terminal end 126. Fourth receptacle piece 118 is received on fourth terminal end 92 of fourth branch receiving arm 90.

Table top assembly 70 further includes a sixth jig table to basket jig 130 having a sixth receptacle piece 132, a sixth left extending arm 143 having a sixth left terminal end 136, and a sixth right extending arm 138 having a sixth right terminal end 140. Sixth receptacle piece 132 is received on sixth terminal end 100 of sixth branch receiving arm 98.

Sixth right terminal end 140 of sixth right extending arm 138, first terminal end 80 of first support arm 78 and second left terminal end 110 of second left extending arm 108 are colinear.

Second right terminal end 114 of second right extending arm 112, third terminal end 88 of third support arm 86 and fourth left terminal end 122 of fourth left extending arm 120 are colinear.

Fourth right terminal end 126 of fourth right extending arm 124, fifth terminal end 96 of fifth support arm 94 and sixth left terminal end 136 of sixth left extending arm 143 are colinear.

First jig table base 150 (FIGS. 1, 2, 9-11) is supported on sixth right extending arm 138, first support arm 78, and second left extending arm 108. As best seen in FIG. 9, first jig table base 150 has a first inner longitudinal support piece 152 and a first outer longitudinal support piece 154 connected by a plurality of bridge pieces 156. First inner longitudinal support piece 152 has a length of 138 inches. First outer longitudinal support piece 154 has a length of 138 inches. A plurality of inner dowel receptacles 158 (FIGS. 1, 2, 9, 10, 12, 13A) are secured to first inner longitudinal support piece 152. A plurality of outer dowel receptacles 160 (FIGS. 1, 2, 9-10, 12, 13B) are secured to first outer longitudinal support piece 154. A plurality of inner upwardly extending members 162 (FIGS. 1, 2, 9-11, 12, 14A-14C) are affixed to first inner longitudinal support piece 152. A plurality of inner rod receptacles 163 are affixed to first inner longitudinal support piece 152. A plurality of outer upwardly extending members 164 (FIGS. 1, 2, 9-10, 12) are affixed to first outer longitudinal support piece 154. A plurality of outer rod receptacles 165 are affixed to first outer longitudinal support piece 154. Inside tube 157 (FIG. 9) is located under first inner longitudinal support piece 152. Outside tube 157 is located under first outer longitudinal support piece 154. A plurality of tube clamps 159 (FIGS. 1, 9, 11, 12) are affixed to tubes 157 and 158. As best seen in FIG. 12, a side clamp 164 and counter weight 165 are affixed to each tube clamp 159.

A second jig table base 170 (FIGS. 1, 2) is supported on second right extending arm 112, third support arm 86, and fourth left extending arm 120.

A third jig table base 190 (FIGS. 1, 2) is supported on sixth left extending arm 134, fifth support arm 94, and fourth right extending arm 124.

Jig table bases 150, 170, 190 each preferably have identical components including an inner longitudinal support piece 152 and an outer longitudinal support piece 154 connected by a plurality of bridge pieces 156. Inner longitudinal support piece 152 preferably has a length of 138 inches. Outer longitudinal support piece 154 preferably has a length of 138 inches. A plurality of inner dowel receptacles 158 are secured to inner longitudinal support piece 152.

As best seen in FIG. 12, bridge pieces 156 each have a bottom surface 210, an inside surface 212, an outside surface 214, and an upper surface 216 that may be curved and that extends between inside surface 212 and outside surface 214. Bottom surface 210 preferably has a width of 18.75 inches.

Referring to FIGS. 12 and 13A, inner dowel receptacles 158 have a receiving piece 220 having a lower wide end 222, an upper narrow end 224, and a raised edges 226. Raised edges 226 preferably have a height of 1.25 inches. Upper narrow end 224 is secured to inner longitudinal support piece 152. In one embodiment, upper narrow end 224 has a width of 1.5 inches. In one embodiment, lower wide end 222 has a width of 3 inches.

Referring to FIGS. 12 and 13B, outer dowel receptacles 160 have a receiving piece 230 having a lower wide end 232, an upper narrow end 234, and raised edges 236. In one embodiment, raised edges 236 have a height of 1.25 inches. Upper narrow end 234 is secured to outer longitudinal support pieces 154. In one embodiment, upper narrow end 234 has a width of 1.5 inches. In one embodiment, lower wide end 232 has a width of 3 inches.

Receiving piece 220 of inner dowel receptacles 158 and receiving piece 230 of outer dowel receptacles 160 angle downwardly towards bridge piece 156. Lower wide end 222 of inner dowel receptacles 158 and lower wide end 232 of outer dowel receptacles 160 are spaced closer together while upper narrow end 224 of inner dowel receptacles 158 and upper narrow end 234 of outer dowel receptacles 160 are spaced further apart. In one embodiment, receiving piece 220 of inner dowel receptacles 158 and receiving piece 230 of outer dowel receptacles 160 form an angle of 132.8 degrees therebetween.

Referring to FIGS. 12 and 14A-14C, upwardly extending members 162 have a receiving surface 240 having an upper end 242 and a lower end 244, a guide 246, and a receptacle 248. Receiving surface 240 preferably has a length of 5.0 inches.

Robot pickup assembly 250 (FIG. 15) is affixed to a robotic arm at connector 252. Robot pickup assembly 250 includes tube 254 connected to connector 252 via tube connection 256. Air cylinder connector 256 receiving air pressure for powering clamps 258 and hook 260. Other means for powering connector 252 are also contemplated, including hydraulic, electrical, and other means. Hooks 260 are spaced to be received between dowel bars 29 of dowel basket 22. Application of air pressure into air cylinder connector 256 results in extension of hooks 260. Dowel baskets 22 may then be lifted by a robotic arm (not shown) and placed in a receiving location when assembled dowel baskets 25 may be stacked in a "dowel bar down" orientation.

Figure 2:
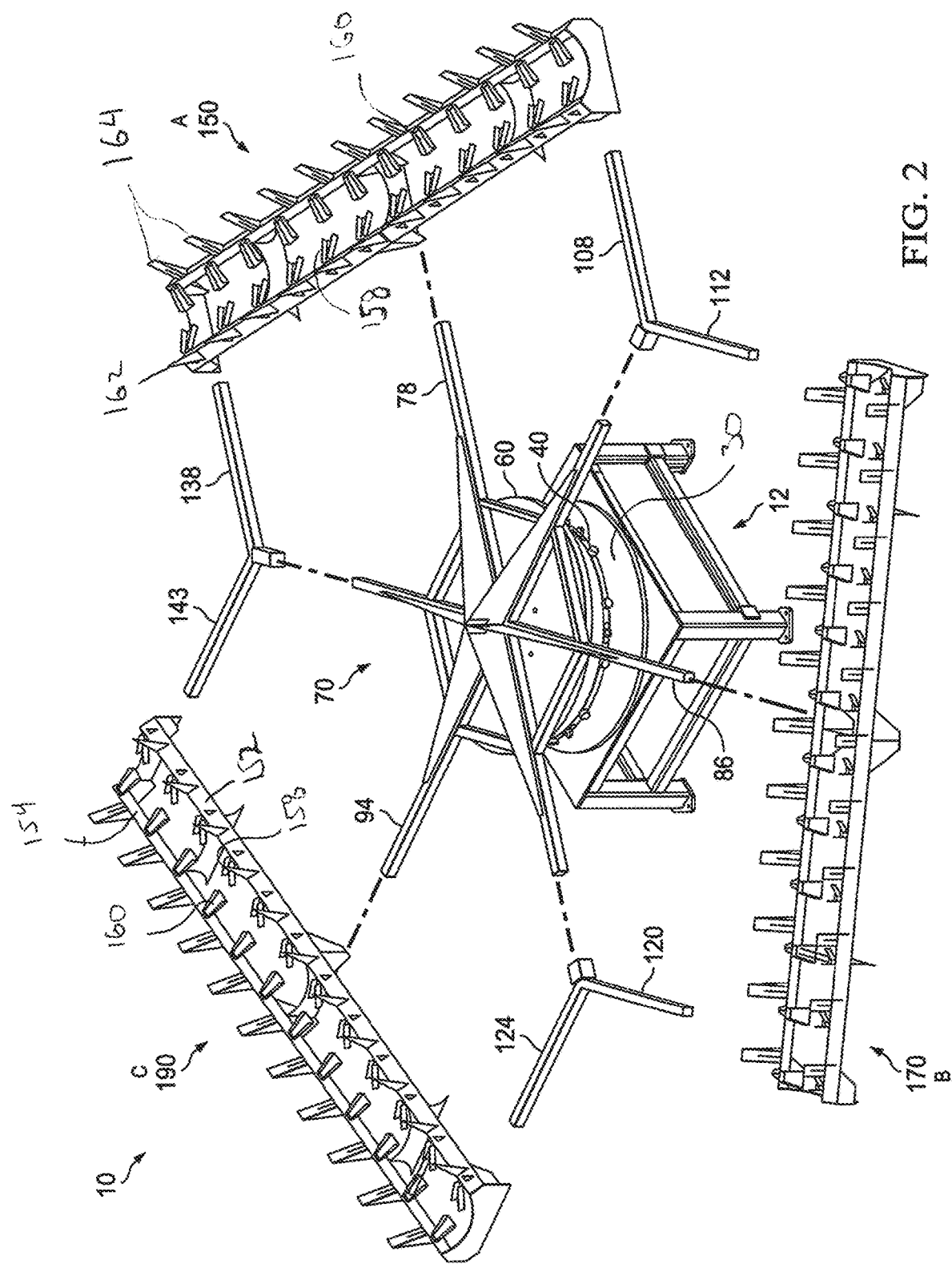
FIG. 2 is a partially exploded perspective view of the rotatable assembly apparatus of FIG. 1.

In practice, dowel basket assembly apparatus 10 includes three stations, i.e., loading station A, welding station B, and unloading station C (see FIG. 1). The stations are fixed while dowel assembly apparatus rotates each of three sides through stations A, B, and C. For example, first jig table base 150 may be positioned adjacent to the loading station. Inside longitudinal dowel assembly 23, outside longitudinal dowel assembly 24, loops 28, cross members 25, and dowel bars 29 are placed on first jig table base 150. In particular, lower rod 27 is located within receptacle 248 between lower end 244 and guide 246 of upwardly extending members 162. Dowel bars 29 are received within loops 28 affixed to inside longitudinal rod assembly 23 and outside longitudinal rod assembly 24. Cross members 25 are positioned to span between upper rods 26 of inside longitudinal rod assembly 23 and outside longitudinal rod assembly 24.

Simultaneously, a welder at station B welds cross members 25 to inside longitudinal rod assembly 23 and outside longitudinal rod assembly 24 of a second dowel basket adjacent to second jig table base 170. In one embodiment, welding is conducted by a robotic welding apparatus. In another embodiment, welding is conducted manually. Simultaneously, a third dowel basket at station C is removed by robot pickup assembly 250 attached to a robotic arm adjacent third jig table base 190, and placed in a receiving area. In one embodiment, removal is conducted by robot pickup assembly 250 attached to a robotic arm. In a second embodiment, removal is conducted manually.

Dowel basket assembly apparatus 10 is then rotated so that the empty third jig table base 190 is moved from third station C to first station A, the placed dowel basket components 23, 24, 25, 29 on jig table base 150 are moved from first station A to second station B for welding, and a newly welded dowel basket on second jig table base 170 is moved from second station B to third station C for removal.

While dowel basket assembly apparatus 10 is rotating, a downwardly extending trigger 167 contacts a trigger activator during travel from station A to station B and is pushed upwardly. Movement of trigger 167 activates a sensor that causes rotation of tubes 157, 158 and attached tube clamps 159 for moving basket side clamps 161 into engagement with recently placed longitudinal rod assemblies 23, 24 as jig table base 150 travels from station A to station B, i.e., the longitudinal rod assemblies 23, 24 on first jig table base 150 are secured by basket side clamps 164 to prepare for welding at station B.

When downwardly extending trigger 167 is pushed upwardly, and a sensor is activated, tube 251 and attached tube clamp 159 are rotated in an opposite direction as the tube travels from station B to station C, i.e., basket side clamps 161 open to release freshly welded dowel basket 22 for removal upon arrival at station C.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A dowel basket welding assembly apparatus for fabricating dowel baskets comprising:
    a jig table rotationally supported on a bearing assembly;
    a table top assembly supported by said jig table and defining a center, said table top assembly having a first arm, a second arm, and a third arm extending radially from said center, said arms defining a top surface;
    said first arm supporting a first jig table base, said second arm supporting a second jig table base, and said third arm supporting a third jig table base; each said first jig table base, said second jig table base, and said third jig table base have an inner longitudinal support piece and an outer longitudinal support piece respectively, that are tangentially oriented with respect to said jig table for receiving dowel basket components for forming the dowel baskets, said inner longitudinal support piece and said outer longitudinal support piece of each said jig table bases are connected by a plurality of bridge pieces respectively;
    a plurality of inner dowel receptacles secured to said inner longitudinal support piece;
    a plurality of outer dowel receptacles secured to said outer longitudinal support piece;
    a plurality of inner upwardly extending members affixed to said inner longitudinal support piece;
    a plurality of outer upwardly extending members affixed to said outer longitudinal support piece;
    wherein said jig table bases rotate through a first station, a second station, and a third station by rotating said jig table;
    a first branch receiving arm extending radially from said jig table on a first side of said first arm;
    a second branch receiving arm extending radially from said jig table on a second side of said first arm;
    a first extending arm extending outwardly at an angle from said first branch receiving arm towards said first arm;
    a second extending arm extending outwardly at an angle from said second branch receiving arm towards said first arm;
    said first jig table base supported on said first arm and said first extending arm extending from said first branch receiving arm.

2. The dowel basket assembly apparatus according to claim 1 wherein:
    said first arm extending radially from said jig table to a first terminal end, said second arm extending radially from said jig table to a third terminal end, said third arm extending radially from said jig table to a fifth terminal end,
    said first branch receiving arm extending radially from said jig table to a terminal end of said first branch receiving arm, said first branch receiving arm between said first support arm and said second support arm;
    said second branch receiving arm extending radially from said jig table to a terminal end of said second branch receiving arm, said second branch receiving arm between said second support arm and said third support arm;

a third branch receiving arm extending radially from said jig table to a terminal end of said third branch receiving arm, said third branch receiving arm between said third support arm and said first support arm.

3. The dowel basket assembly apparatus according to claim 1 wherein:

said table top assembly including vertical supports affixed to said top surface of said arms and having a first end adjacent said center and having a second end a distance away from said center.

4. The dowel basket assembly apparatus according to claim 1 further comprising: a bearing tray supported by said top member, said bearing tray having an upwardly extending outer lip.

5. The dowel basket assembly apparatus according to claim 4 further comprising:

said bearing assembly received in said bearing tray, said bearing assembly having a bearing ring defining an outside diameter, a plurality of equally spaced rollers each secured to said outside diameter, 6 equally spaced bearing mounts each secured to said outside diameter by a pair of bolts.

6. The dowel basket assembly apparatus according to claim 1 wherein:

wherein said terminal ends of said extending arms and said terminal end of said first arm are co-planar for supporting said first jig base table.

7. The dowel basket assembly apparatus according to claim 1 further comprising:

wherein said bridge pieces having a bottom surface, an inside surface, an outside surface and an upper surface extending between said inside surface and said outside surface.

8. The dowel basket assembly apparatus according to claim 1 further comprising:

said inner dowel receptacles having a planar piece having a lower wide end, an upper narrow end, and raised edges extending upwardly for receiving and retaining a dowel bar, said upper narrow end secured to one of said inner longitudinal support pieces.

9. The dowel basket assembly apparatus according to claim 1 further comprising:

said outer dowel receptacles having a planar piece having a lower wide end, an upper narrow end and raised edges extending upwardly for receiving and retaining a dowel bar, said upper narrow end secured to one of said outer longitudinal support piece.

10. The dowel basket assembly apparatus according to claim 8 further comprising:

said planar piece of said inner dowel receptacles and said planar piece of said outer dowel receptacles angle away from one another, wherein a lower wide end of said inner dowel receptacles and an upper wide end of said outer dowel receptacles are spaced closer together and said upper narrow end of said inner dowel receptacles and said upper narrow end said outer dowel receptacles are spaced further apart.

11. The dowel basket assembly apparatus according to claim 1 further comprising:

said inner upwardly extending members having a planar piece having an upper end and a lower end, said inner upwardly extending members extending above said first longitudinal support piece;

said inner upwardly extending member further defines a receptacle adjacent a lower end of said planar piece, said receptacle for receiving and supporting an inside longitudinal rod assembly, said planar piece for orienting said inside longitudinal rod assembly at a desired angle with respect to vertical.

12. The dowel basket assembly apparatus according to claim 1 further comprising:

said outer upwardly extending members having a planar piece having an upper end and a lower end and a support piece outer surface, said outer upwardly extending members extending above said second longitudinal support piece;

said outer upwardly extending member further defining a receptacle adjacent a lower end of said planar piece, said receptacle for receiving and supporting an outside longitudinal rod assembly, said planar piece for orienting said outside longitudinal rod assembly at a desired angle with respect to vertical.

\* \* \* \* \*